United States Patent

Hed

[11] Patent Number: 5,727,108
[45] Date of Patent: Mar. 10, 1998

[54] HIGH EFFICIENCY COMPOUND PARABOLIC CONCENTRATORS AND OPTICAL FIBER POWERED SPOT LUMINAIRE

[75] Inventor: Aharon Zeev Hed, Nashua, N.H.

[73] Assignee: Troy Investments, Inc., Nashua, N.H.

[21] Appl. No.: 724,069

[22] Filed: Sep. 30, 1996

[51] Int. Cl.$^6$ ................................................. G02B 6/10
[52] U.S. Cl. .................................................. 385/133; 362/32
[58] Field of Search .......................... 385/54, 102, 58,
385/69, 74, 31, 33, 146, 901; 174/70 R;
439/206, 271, 578; 362/32, 347

[56] References Cited

U.S. PATENT DOCUMENTS

| | | | |
|---|---|---|---|
| 3,914,015 | 10/1975 | McCartney | 385/54 |
| 4,505,264 | 3/1985 | Tremblay | 359/834 |
| 4,606,603 | 8/1986 | Cairns | 385/58 |
| 4,693,601 | 9/1987 | Dabelstein et al. | 356/237 |
| 5,187,983 | 2/1993 | Bock et al. | 250/227.17 |
| 5,271,077 | 12/1993 | Brockman et al. | 385/31 |

*Primary Examiner*—Akm E. Ullah
*Attorney, Agent, or Firm*—Herbert Dubno

[57] ABSTRACT

A compound parabolic concentrator which can be used as an optical connector or in a like management system or simply as a concentrator or even as a spotlight, has a hollow body formed with an input aperture and an output aperture and a wall connecting the input aperture with the output aperture and diverting from the smaller of the cross sectional areas to the larger cross sectional areas of the apertures. The wall is composed of contiguous elongated prisms of a transparent dielectric material so that the single reflection from the inlet aperture to the outlet aperture takes place within the prisms and thus the losses of purely reflective reflectors can be avoided.

19 Claims, 6 Drawing Sheets

HIGH EFFICIENCY COMPOUND PARABOLIC CONCENTRATORS AND OPTICAL FIBER POWERED SPOT LUMINAIRE

FIELD OF THE INVENTION

My present invention relates to light concentrators and, more particularly, to concentrators based upon surfaces of revolution and especially parabolic and hyperbolic concentrators and concentrators utilizing more complex surfaces. The invention thus relates inter alia to a high efficiency parabolic concentrator and to an optical-fiber-powered spot luminaire.

BACKGROUND OF THE INVENTION

A compound parabolic concentrator (CPC) is characterized by the fact that rays entering the device at its large aperture (the input aperture) are reflected only once from the inner surface before exiting the CPC at its small aperture (output aperture). A good textbook summarizing the prior art in the field is "High Collection Nonimaging Optics" by W. T. Welford and R. Winston, Academic Press, 1989. This passive optical device is often termed a "nonimaging optical device" since, unlike standard optical devices that strive to obtain a conformal image (real or imaginary) of an object, a CPC is designed to concentrate a given flux of light or energy (at the input aperture) to a higher flux of light at the output aperture.

For a linear CPC or a two-dimensional CPC, the major source of optical losses resides in absorption of part of the reflected beam in the CPC reflector. Depending on the quality of this reflector, these losses can range from a minimum of about 3% in excellent reflectors to 20% or more in mass produced reflectors. Furthermore, the manufacturing processes for high quality mirrored surfaces is relatively expensive and despite the fact that CPCs have been known since before 1970 (Hinterberger, H. and Winston, R. "Efficient light coupler for threshold Cerenkov counters" Rev. Sci. Instrum. 37 1094–1095, 1966 and Winston, R. "Principles of solar concentrators of a novel design, Sol. Energy 16, 89–95, 1974), except for solar concentrators, the CPC has not found wide-spread consumer application.

One can also use a CPC made of a solid dielectric material having low absorption losses, however, the volume of material required (at least for larger geometries) has a negative impact on cost, and furthermore, has the problem that at the output of a solid dielectric CPC, light must be extracted into a material of the same or higher dielectric constant to prevent total internal reflection causing return of some of the rays to the input aperture.

The present invention rectifies the cost problems associated with high quality reflectors and solid dielectric concentrators by using in lieu of a reflective surface in a concentrator, a refractive reflector designed in accordance with the principles of total internal reflection in transparent dielectric materials. These principles have not hitherto been used successfully in light concentrators. The principles of refractive/reflective surfaces by total internal reflection have been used in optical instruments for many years. For instance, most field binoculars contain in each eye piece at least one prism that reverses light direction via refraction and total internal reflection. Lorne A. Whitehead has used the same principles in building prismatic light guides (U.S. Pat. No. 4,260,220) in which light impinges on the prismatic surface a large number of times and is reflected therefrom by total internal reflection at minimal losses, if (and only if) the cross section of the light guide is constant.

OBJECTS OF THE INVENTION

It is the principal object of the present invention to provide an improved high efficiency compound concentrator for the concentration of an optical flux which is free from drawbacks of earlier concentrators.

It is another object of the invention to provide an optical-fiber-powered spot luminaire employing an improved light concentrator.

It is a more specific object of the present invention to provide an improved compound parabolic concentrator.

It is a further object of this invention to provide a low cost, high efficiency CPC that can be mass produced by means of microreplication or injection molding.

It is another further object of the invention to provide such CPCs that are linear (2D) CPCs, for solar concentrators as well as circular (3D) CPCs and hybrid CPCs for concentrating or dispersing circular and other light sources.

It is an additional object of this invention to provide optical-fiber-powered spot luminaires and high efficiency optical connectors.

It is yet another object of the present invention to provide low-cost low-loss optical connectors.

SUMMARY OF THE INVENTION

These objects and others which will become apparent hereinafter are achieved, in accordance with the invention in a compound concentrator comprising a transparent dielectric structure having at least one internal reflecting surface concentrating light received from a large input cross section at a smaller output cross section.

In the CPC's of the present invention a modified prismatic dielectric structure is used as the reflecting surface of the CPC acting as a refractive reflector, and the light rays undergo a single reflection from the prismatic surface between the input aperture and the output aperture of the CPC. In so doing, there are much smaller absorption losses as compared to metallic and other polished reflectors.

The present invention enables the low-cost production of a novel type of spot light or spot luminaire, and optical-fiber-powered spot luminaire. Light emerging from the end of an optical fiber, or a fiber bundle has an angular distribution equal to the angle of acceptance of these fibers. Since for illumination purposes, one usually uses fibers having a very large angle of acceptance, the light emitted creates a relatively large angle cone (typically the cone half angle is between 30° to 45°), and this angle depends on the respective indices of refraction of the fiber core and cladding. For many applications, it is desired to narrow the angle of emission so that the light can be projected in a narrower angle. State of the art optics to achieve this goal require complex optical elements or expensive CPC's. CPC's of the present invention can be easily used to accept the large angle of acceptance output of fiber bundles at their narrow aperture and emit light within a narrow angle of emission determined by the concentration ratio of the selected CPC.

The concentrator of the invention, which we will term hereinafter a CPC whether or not the concentrator has a parabolic or other geometry has its reflecting structure made of a prismatic, transparent, low-transmission loss dielectric material with an index of refraction generally above √2, preferably above 1.5. The prismatic axis of each of the microprisms is in a plane containing the optical axis of the CPC and the shape of the CPC is essentially equivalent to that of a similar traditional reflection based CPC. In the linear or 2D CPC of the instant invention, the prismatic cross section is constant along each prismatic structure, while in the 3D version CPC of the present invention, the cross sectional dimensions of the prismatic structures decreases as the radius of the CPC decreases from the input aperture to the exit aperture. The invention includes hybrid concentrators that are combinations of 3D and 2D structures and structures which can be combinations of different surfaces of revolution such as a complex of a parabolical surface and a hyperboloidal surface.

The dielectric materials from which the reflecting walls of the CPC's are made can be transparent polymers with a high index of refraction, such as but not limited to, acrylic polymers or polycarbonate based polymers. Other materials may be dielectric inorganic solids such as but not limited to, glasses and various transparent ceramics, like magnesium oxide, magnesium aluminate spinels and aluminum oxynitrides. For some unique applications in far infrared optics, salts such as NaI and KBr can be shaped into the desired structure as well.

More particularly, the invention comprises an optical device which can form a concentrator or a spotlight type of device and which comprises a hollow body formed at one side with an input aperture of a first cross sectional area and connectable to a light source, and formed at an opposite side with an output aperture of a second cross sectional area different from the first area for delivery of light at the second cross sectional area; and wall means connecting the input aperture with the output aperture and diverging from a smaller of the cross sectional areas to a larger of the cross sectional areas, the wall means consisting of contiguous elongated prisms of a transparent dielectric material extending between the apertures and defining internal reflection paths at least in part along a cross section of a surface of revolution and enabling single-reflection transmission of light from the inlet aperture to the outlet aperture within the wall means whereby the light flux is greater at the smaller of the cross sectional areas than at the larger of the cross sectional areas.

According to a feature of the invention the input aperture is the larger of the cross sectional areas and the device is the optical concentrator mentioned. When the device is formed as a spotlight, the input aperture is the smaller of the cross sectional areas.

The body can have a closed periphery around an axis connecting the input aperture with the output aperture, i.e. the optical axis of the device. For a two dimensional or linear device, the wall means can be formed with a pair of walls extending symmetrically on opposite sides of a medium plane connecting the input aperture with the output aperture. In this case the apertures can be rectangular.

Preferably each of the prisms has a base flank defining a surface of the hollow body bounding an interior space thereof and a pair of flanks including angles of 45° with the base flank and 90° with one another. The base flanks can angularly adjoin one another about the optical axis so that the cross section of the device is that of a polygon. Alternatively, the base flank of adjoining prisms can merge smoothly into one another.

While the surface of revolution is generally parabolical as has been indicated previously, the surface of revolution can be partly conical or even partly hyperbolical.

The invention also comprises a like distribution system which can include a light source, an optical device disposed to receive light from said source and an optical fiber system for distributing light from the device. The optical device can comprise a hollow body formed at one side with an input aperture of a first cross sectional area and connectable to the light source, and formed at an opposite side with an output aperture of a second cross sectional area different from the first area for delivery of light at the second cross sectional area, and wall means connecting the input aperture with the output aperture and diverging from a smaller of the cross sectional areas to a larger of the cross sectional areas, the wall means can consist of contiguous elongated prisms of a transparent dielectric material facing the hollow and extending between the apertures and defining internal reflection paths at least in part along a cross section of a surface of revolution and enabling single-reflection transmission of light from the inlet aperture to the outlet aperture within the wall means whereby the light flux is greater at the smaller of the cross sectional areas than at the larger of the cross sectional areas. At least one luminaire can be positioned to receive light from the optical device through the optical fiber system connected to one of the apertures.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
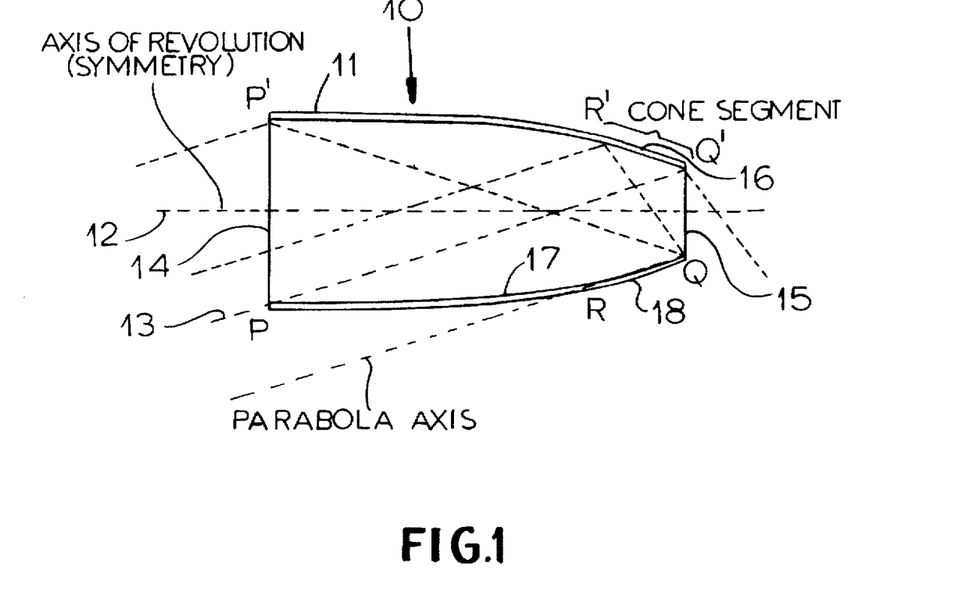
FIG. 1 is a cross section through either a linear or a circular $\theta_i/\theta_o$ concentrator and describes its construction.

FIG. 1 shows a cross section through a compound parabolic concentrator (CPC) 10 of the instant invention. Such a structure is also known as a CPC of the $\theta_i/\theta_o$ type, where i and o denote respectively input and output (see for instance Appendix E of "High Collection Nonimaging Optics", W. T. Welford and R. Winston, Academic Press, 1989). Such a circular concentrator can be constructed, as illustrated in FIG. 1, by taking a segment 11, of a parabola P'R' having its focal point at Q and rotating this segment around an axis of revolution 12, which is at an angle $\theta_i$ to the parabola's axis 13. The axis of rotation defines the centers of the input aperture 14 (PP'), and the output aperture 15 (QQ'). The end segment 16 (R'Q') is a truncated conical element which has an angle $(\theta_o-\theta_i)/2$ relative to the axis of symmetry, 12. The inner surface of a prior-art concentrator is traditionally made of a specular mirror whose absorption can range from 3% in very high quality mirrors to more than 20% in mass produced mirrors. A linear concentrator is built by taking two curved surfaces (11 and 17 in FIG. 1) and extending them in a direction perpendicular to the cross section shown in FIG. 1. i.e. perpendicular to the plane of the paper.

The second surface 17, is "anchored" at the focal point of the generating parabolic surface 11, so that its linear segment 18, forms the same angle $(\theta_o-\theta_i)/2$ with the axis of symmetry 12. Essentially, therefore, FIG. 1 is the cross section of either a linear or a circular concentrator. Such a CPC is characterized by the fact that all rays entering it in the input aperture, 14, at angles smaller than $\theta_i$ will exit the CPC after no more than a single reflection within the angle $\theta_o$.

The concentration ratio, $C(\theta_i,\theta_o)=R/r$, where $2r=QQ'$ and $2R=PP'$ for a 2D concentrator is given by:

$$C(\theta_i, \theta_o) = \frac{R}{r} = \frac{\sin \theta_o}{\sin \theta_i} \quad (1)$$

The concentration ratio for a 3D (circular) concentrator is given by:

$$C(\theta_i, \theta_o) = \frac{R^2}{r^2} = \left[\frac{\sin \theta_o}{\sin \theta_i}\right]^2 \quad (2)$$

The length 1, of the CPC is given by the relationship:

$$1=(r+R)\cot \theta_i \quad (3)$$

It can be seen that the maximum concentration ratio for a CPC designed for rays arriving within a given angle $\theta_i$ occurs when the output angle $\theta_o$ is ½π. In this case the conical segment 16 (or linear segment for a linear CPC), R'Q' in FIG. 1, is eliminated since the parabolic segment PR' is continued to the exit aperture QQ'.

Figure 2:
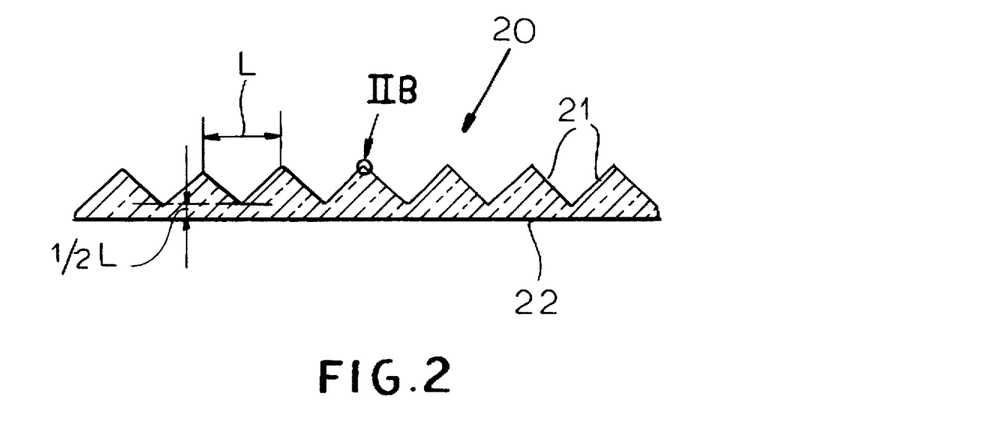
FIG. 2 is a cross section through a prismatic refractive reflector of a linear CPC.
Figure 2A:
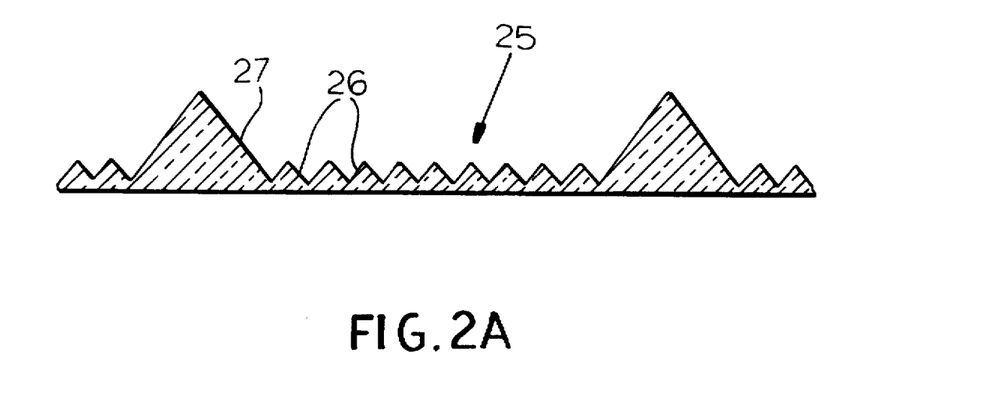
FIG. 2A is another cross section through a similar reflector.
Figure 2B:
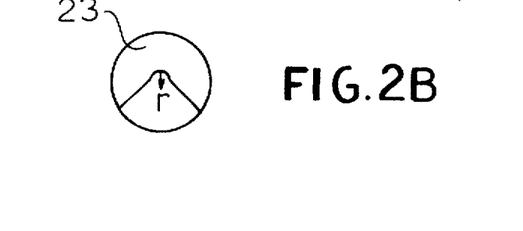
FIG. 2B is a detail of the section of FIG. 2.
Figure 3:
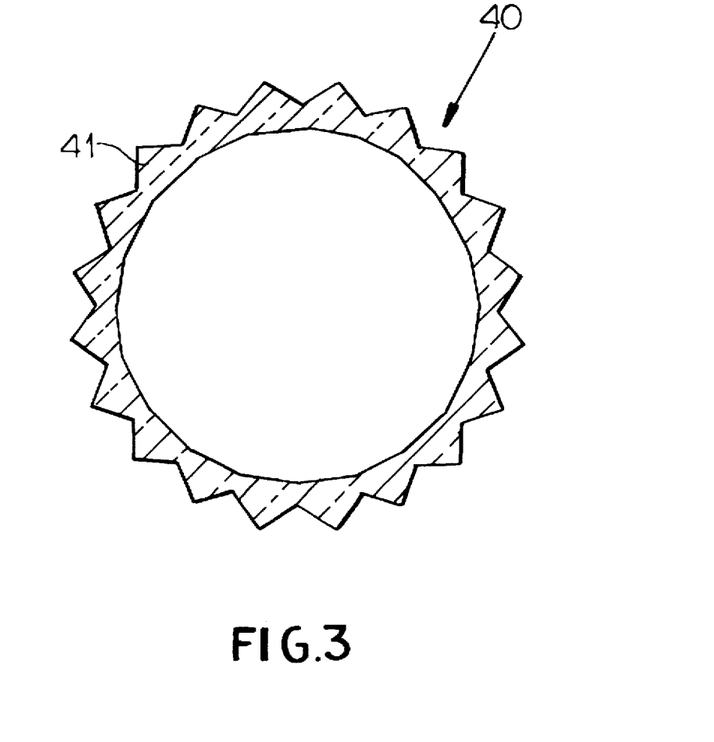
FIG. 3 is a cross section through a prismatic refractive reflector of a circular CPC.
Figures 4, 5, 6:
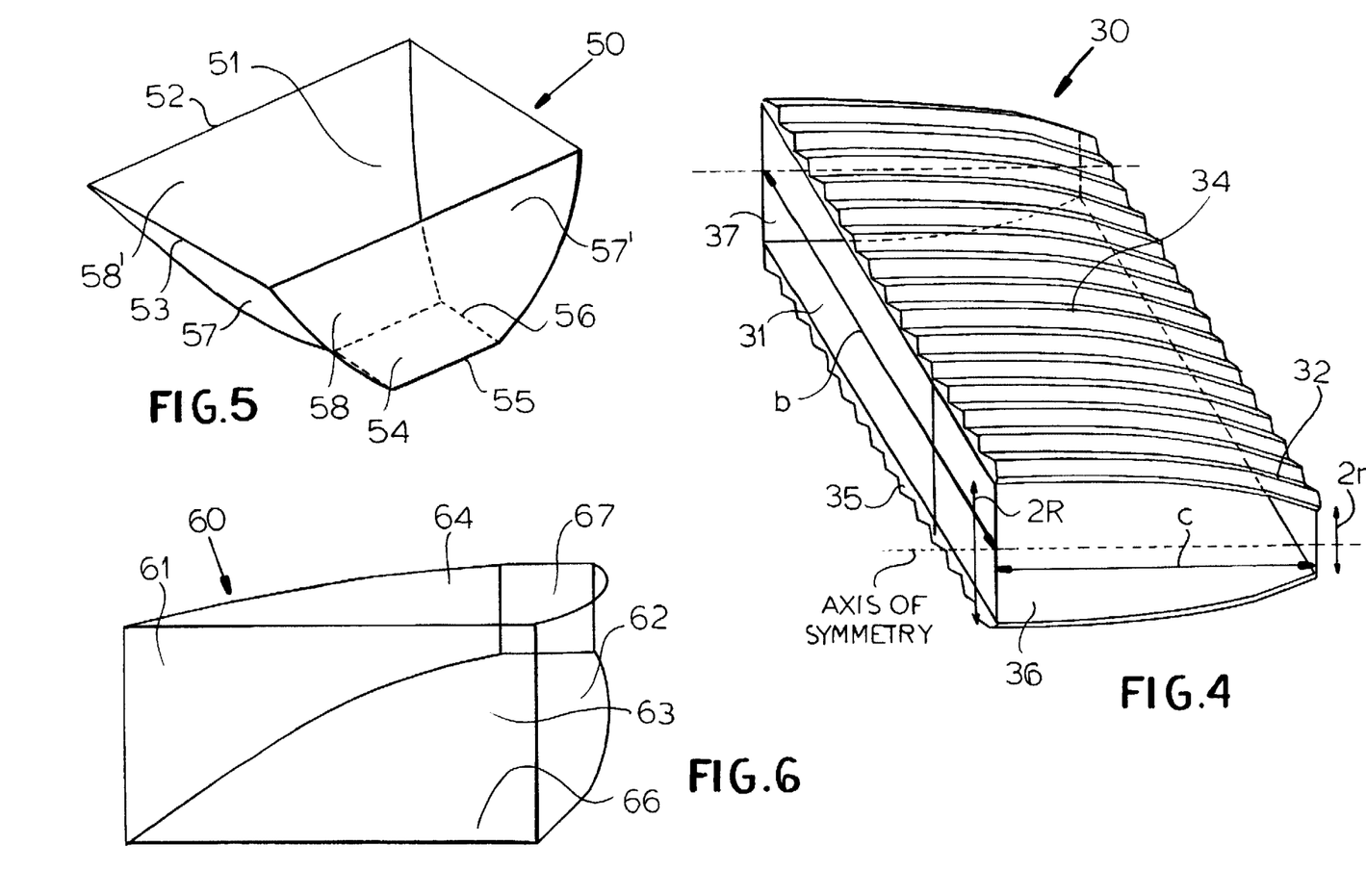
FIG. 4 is a general perspective view of a linear CPC.
FIG. 5 is a general perspective view of a 3D cross CPC.
FIG. 6 is a general perspective view of an asymmetric concentrator.

In the present invention the reflecting surface 17 of a CPC is formed by a dielectric prismatic reflector as shown in FIGS. 2, 2A, 2B, 3 and 4. A linear CPC of the instant invention is shown in FIG. 4, and a segment of the prismatic reflector cross section is shown in FIG. 2. As can be seen the prismatic reflector 20, consists of a series of adjacent prisms, 21, whose base length is L and the prismatic dielectric reflecting sheath has a minimum thickness of i (at the bases of the prisms). Thus the maximum sheath thickness is i+½L. It is not necessary that all prisms be of the same dimensions, as long as the apexes of the prism are 90°. Except for some unique and unusual CPC geometries, there are no advantages in mixing prisms of different dimensions in a single structure, from the optical point of view. However, since the prismatic Sheath volume should be minimized to reduce costs, the CPC geometry in larger structures can be compromised. In such cases, one can use a prismatic sheath 25, as shown in FIG. 2A, where very small prismatic structures 26 are separated by larger prismatic structures 27 which provide the CPC with its required stiffness to maintain its geometry. In some CPCs it is advantageous to simultaneously decrease or increase the dimension of all the prisms gradually along a given segment of a concentrator. This is particularly true for 3D concentrators, as will be discussed below.

The prismatic reflector is preferably made of a low optical loss dielectric material with an index of refraction n in excess of √2 or preferably, larger than 1.5. The direction of the prismatic striations is codirectional with the CPC's axis of symmetry (12 in FIG. 1). The flat surface 22 faces the internal hollow space of the CPC and acts to refract beams so that they are reflected back via total internal reflection by the prismatic structures 21 (or 26 and 27 in FIG. 2A), which outer surfaces are always at 45° to the flat surface, 22.

It can be shown that for such a prismatic dielectric reflector all rays impinging the reflector at an angle smaller than a given $\theta_{max}$ to a tangent to the CPC reflecting surface, undergo total internal reflection and reemerge inside the concentrator at their angle of impingement. The critical angle $\theta_{max}$ is a function of the dielectric constant of the transparent dielectric and is equal to:

$$\theta_{max} = \arccos \left[\frac{1-n^2\sin^2(\pi/8)}{1-\sin^2(\pi/8)}\right]^{\frac{1}{2}} \quad (4)$$

For n=1.5, one can show that $\theta_{max}=27.6°$.

The largest angle of incidence on the CPC inner surface 22 occurs for rays exiting the CPC at the angle $\theta_o$. It can be shown that the angle of incidence of these rays with the inner surface of the prismatic reflector is given by $(\theta_i+\theta_o)$, namely, all rays exiting the CPC at angles smaller than $\theta_o$ will impinge upon the surface 22 at angles smaller than $(\theta_i+\theta_o)$ /2. Therefore, the CPC of the instant invention is capable of handling, without extraction losses, rays with an output angular distribution smaller than $\theta_o=55.2°-\theta_i$. For clarity, those optical losses that are due to rays escaping the CPC by not undergoing total internal reflection are termed "extraction losses".

A linear concentrator 30 as shown in FIG. 4 has a rectangular input aperture 31 with the dimensions 2R×b, where b can be any desired width and an output aperture 32 with the dimensions 2r×b. The length 1 of the CPC is determined by the design parameters r, R and $\theta_i$ as shown in equation 3. These parameters provide the concentration ratio R/r and the maximum input aperture angle from which rays are concentrated. If some rays reach the input aperture at angles larger than $\theta_i$, they will not always emerge at the output aperture; most of these rays will be extracted from the prismatic surface and some will be reflected back.

The main reflecting surfaces 34 and 35 are prismatic reflectors as shown in FIG. 2. In some applications, the side surfaces 36 and 37 can be left open or closed, and depending on the CPC aspect ratio (2R/b), these surfaces can be either normal reflectors or prismatic reflectors. In most applications of a linear CPC reflection contributions from these surfaces are minimal.

In solar applications, where the concentrator tracks the direction of the sun, one can assume that the input angle $\theta_i$ of the incoming sun rays is within 1°, since the subtending angle of the sun is less than 0.25° and an additional 0.75° can be allowed for tracking inaccuracies and system vibrations. Under these circumstances, the concentration ratio is sin 54.2°/sin 1°=0.81106/0.01745=46.6 which is 81% of the maximum theoretical concentration ratio of 57.5 feasible ($\theta_o$=½π). As will be seen below, this decrease in concentration ratio feasible with concentrators of the instant invention is amply compensated by the higher reflection efficiency of the system.

If a dielectric is used with an index of refraction n=1.8, we can see from equation 4, that the largest angle of impingement on the reflector $\theta_{max}$ feasible without incurring extraction losses increases to 38.3°, which yields an output angle $\theta_o$=75.6° which will provide a concentration ratio which is 96.9% of the theoretical maximum concentration.

When using the CPC as a circular light concentrator, we use for the reflector 40, a structure whose general cross section is depicted in FIG. 3. This reflector is constructed from a fixed number of prismatic structures 41, arranged circumferentially and having a cross section that declines as the cross section of the concentrator declines from the input aperture PP' to the output aperture QQ' (see FIG. 1). To obtain optimum performance, the inner surface's cross section of the reflector is made to be a polygon whose segments are always at 45° to the outer surfaces of their respective prismatic structure. The dimensions of the polygon segments decreases in proportion to the decrease of the concentrator radius from the input aperture to the output aperture. However, when the prismatic structures are very small in relation to the concentrator diameter, one may find it easier to manufacture the inner surface as a smooth paraboloid of revolution ending with a conical segment. This choice will result in only minimal extraction losses if the polygon segment length is small relative to the CPC radius.

Both types of reflectors can be easily molded or microreplicated from acrylic resins, once a master mold is produced. For very high performance (and thus higher cost) one can use high index of refraction glasses, transparent ceramics, and for special instruments, salts with a high index of refraction like NaI or KBr. The choice of materials is a delicate balance between cost, concentration ratio desired and optical losses acceptable. In the following we discuss such losses.

Optical losses in the CPC of the invention are due to two main sources. The first source is due to optical attenuation, (mostly absorption and dispersion) through the dielectric material, $a_d$, and the second sources are light extraction losses. The extraction of light rays that impinge upon the reflector at angles larger than $\theta_{max}$ has already been discussed. Additional extraction losses are due to geometrical imperfection of the corners at the tops and bottoms of the prismatic structure $a_g$. If it is assumed that the radius of curvature of the prismatic structure is r (see FIG. 2B), and the base of a given prismatic structure is L, then, if we assume that all light impinging on these radii is extracted, we obtain as an upper limit $a_g=4r/L$. Therefore, to minimize these losses, L>4r. Additional extraction losses result from imperfections (deviations from planarity) of the prismatic elements' surfaces. These can be kept at a minimum during the manufacturing process.

The dielectric losses, $a_d$, are proportional to the attenuation per unit length k in the dielectric and the optical path traversed within the dielectric. It can be shown that the optical path per reflection is:

$$d = \frac{L+2i}{\sqrt{1-\frac{\cos\theta}{n^2}}} \approx \frac{L+2i}{\sqrt{\frac{n^2-1}{n^2}}} \text{ for small } \theta \quad (5)$$

Since the attenuation in a good quality acrylic polymer or other transparent dielectrics can be kept to less than $10^{-5}$/mm, it is clear that most of the losses would be due to geometric imperfections. It should be easy, however to keep the ratio 4r/L under $10^{-2}$, and thus the total reflection losses under 1%. This compares very favorably with losses in excess of 3% for high quality mirrors and losses of between 8 to 15% for mass produced mirrors.

FIG. 5 shows an example of a noncircular CPC 50 of the instant invention having a square input aperture 51 with sides 52 and 53 having the dimensions a and an output aperture, 54, with sides 55 and 56 of length a'. Since the cross section of both apertures is square, the concentration ratio in the two orthogonal directions is the same and given by equation 1. The total concentration is thus the same as given in equation 2. The opposing prismatic reflectors 58 and 58' and 57 and 57' are simply segments of the same 2D concentrator. Structures of this kind are not perfect concentrators and some of the rays arriving within the angle $\theta_i$ are returned. Nevertheless, such a concentrator can be very efficient when concentrating light from rectilinear sources, like high power HID sources. Such concentrators can be referred to as "cross CPCs", since they result from the intersection of two linear CPCs of the same concentration ratio, $C(\theta_i, \theta_o)$ and the same geometry.

Yet another embodiment of the instant invention involves concentration of light from a large rectangular aperture having the dimensions A and B to a smaller rectangular aperture of the dimensions a and b with the same aspect ratio A/B=a/b. Examination of the problem reveals that if we use the same output angle for both set of reflecting surfaces, the length of the two orthogonal linear concentrator differ. Therefore we need to chose different input and output angles for the two CPCs. It is best to optimize the angles of input and output ($\alpha_i$ and $\alpha_o$) for the larger dimension (A and a) CPC and determine the resulting angles of input and output ($\beta_i$ and $\beta_o$) for the smaller dimension (B and b) that yield the same length for both CPC's. When A and B are given, the concentration ratio A/a=B/b is given and the input angle $\alpha_i$ is given, then the angle $\beta_i$ can be determined from cot $\beta_i=[(A+a)/(B+b)] \cot \alpha_i$.

FIG. 6 shows diagrammatically another version of an imperfect concentrator 60 where the two orthogonal directions are concentrated at an unequal ratio, in this case a large rectangular input aperture 66 with the dimensions a and b is concentrated into a smaller square (or rectangular but with a different aspect ratio a'/b') output aperture (and thus, obviously, a/b≠a'/b'). Such systems have many possible configurations, and here we demonstrate one such configuration where the output rays emerge at one design maximum feasible angle $\theta_o$, which yields the highest concentration. Since the concentration ratios in the two orthogonal directions will differ, the maximum feasible input angles will be $\theta_i$ and $\theta_j$, respectively. While one can use an approach similar to that described for the rectangular cross CPC (namely, keeping the length of the two orthogonal concentrator equal while varying the respective input angles), there are circumstances where the following approach may yield better results. Such a concentrator can be built by choosing as the controlling prismatic reflecting surfaces the one with the largest concentration ratio. In FIG. 6 these would be the surfaces 61 and 62. Then the surfaces 63 and 64 are designed with a prismatic reflector constructed to yield its own concentrator ratio and build the concentrator edges as the intersection of the four surfaces. The length of the surfaces 63 and 64 will be shorter than the surfaces 61 and 62 by (a+a')cot $\theta_i$-(b+b')cot $\theta_j$. The "missing" parts of the surfaces 63 and 64 are then simply made to be two parallel and flat segments of prismatic reflector. This approach minimizes extraction losses as well as back reflections, when the light propagation direction is from the large aperture to the small aperture. When the light direction is in the opposing direction, it is best to use the smaller concentration ratio concentrator as the controlling structure, and terminate the longer concentrator at the point of termination of the short concentrator (with the smaller concentration ratio), namely the prismatic reflectors 63 and 64.

In the following are two examples of specific applications of the CPCs of the instant invention.

EXAMPLE 1

Figure 7:
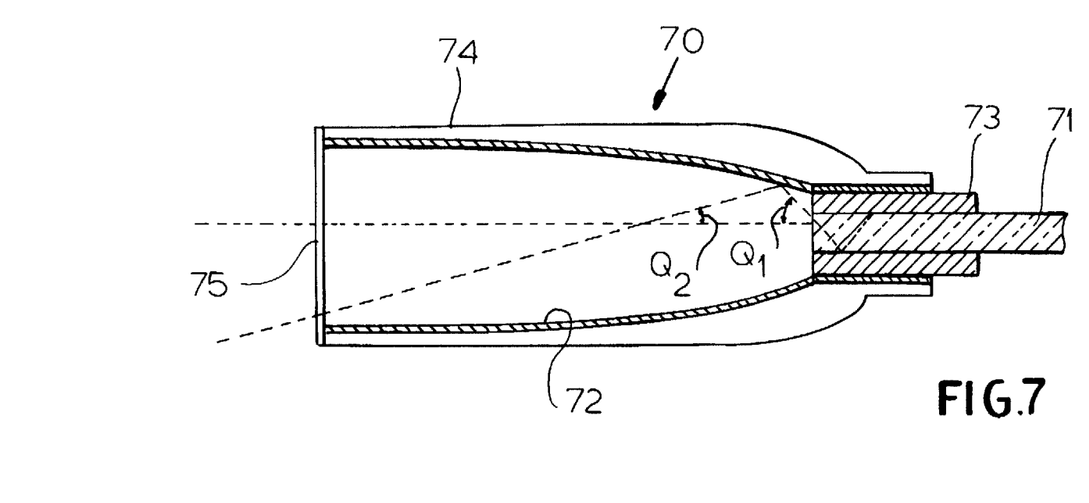
FIG. 7 is a cross section through an optical-fiber-powered spot luminaire.

In some applications, it is desirable to narrow the output beam angular distribution of light emerging from a fiber to a narrower angle, this is particularly true in spotlights, car headlights and various reading lights. FIG. 7 shows a cross section through an optical-fiber-powered spotlight of the instant invention which achieves such narrowing of the angular distribution of light emitted from an optical fiber or a fibers bundle. Light within the fiber 71 is piped from a remotely positioned light source and the angular distribution of this light is determined by the critical angle of propagation within the fiber, and the light emerges within an angular cone which half angle is the angle of acceptance of the fiber. The angle of acceptance for most optical fibers is in the range of 15° to 50°. The lower angle of acceptance usually occurs in single mode fibers which are not important for illumination applications. For most practical illumination purposes, the range of angle of acceptances in commercially available fibers is between 30° and 50°.

In the present invention, a circular $\theta_i/\theta_o$ CPC 72 is used at the output of the light transmitting fiber having a prismatic reflector and having the output angle equal the angle of acceptance of the fiber, namely, $\theta_1=\theta_o$. The input angle $\theta_i$ of the CPC is made to be equal the desired angle of emergence $\theta_2$ of the light from the spotlight 70. The CPC is used in the inverse fashion, namely, it is used to disperse a small light source with a large conical angle of emission into a larger light source with a narrow angle of emission. To avoid confusion, in the case of a spotlight, we will term the traditional CPC output aperture, the "entry aperture", and the traditional input aperture, the "exit aperture". Once the angles $\theta_o$,24 $\theta_1$ and $\theta_2=\theta_i$ are determined, the ratio of the exit and entry aperture is determined, therefore, one needs to chose a spotlight exit aperture to determine its entry aperture. Remembering, however, that in order to avoid excessive extraction losses the relationship $\theta_1 \leq 55.2°-\theta_2$ (for a prismatic reflector with an index of refraction of 1.5) must be maintained.

Under most circumstances, the entry aperture will be larger than the optical fiber bundle. When that is the case, one terminates the fiber with a ferrule 73 having a diameter equal to the entry aperture's diameter. This has no negative impact on the performance of the spotlight. If the spotlight exit diameter desired is very small, and as a result the entry aperture is smaller than the bundle diameter, one needs to reduce the concentration ratio will be reduced. This can be done by reducing $\theta_o$ of the CPC, an action which bear no penalties as long as the reduction is not below the angle of acceptance of the fiber. Therefore, an important design parameter for a fiber optic powered spotlight to minimize extraction losses is the condition:

$$2\theta_{max}-\theta_2 \geq \theta_o \geq \theta_1 \quad (6)$$

where $\theta_{max}$ is the maximum allowed angle of impingement on the prismatic reflector before extraction losses occur, $\theta_1$ is the angle of acceptance of the fibers in the fiber bundle and $\theta_2=\theta_i$ is the largest exit angle of light rays from the spotlight.

One should mention that the outer surface of the prismatic reflectors of the instant invention should be protected from damage and that can be easily achieved with a wrapping film that contacts the prisms at the (already lossy) apexes, or by any contact-less external enclosure 74 as shown in FIG. 7. To protect the inner surface, the exit aperture can be closed with a flat transparent element, 75, as in any spotlight. Since there will always be some back reflection from such a surface into the spot luminaire, an antireflective coating can be provided on the inner face of the element 75.

In a typical application, the optical fiber can have an angle of acceptance $\theta_1=35°$, and a spotlight angle of emission $\theta_2=15°$. If we choose an entry aperture of ½ cm, then the exit aperture will be 1.1 cm and the length of the spotlight will be about 6 cm.

EXAMPLE 2

When using optical fibers to transmit light, it is often desired to connect fiber bundle ends (or single fiber ends) together, or to connect a terminal device, such as a luminaire, to such an end. The current art uses various methods to achieve such terminations or connections. The simplest optical connector is a ferrule, which is a cylindrical structure with an input diameter equal to the external diameter of the fibers to be connected. Ferrules, however, have insertion losses of at least 15% due to reflections at the interface of the two fibers. One can minimize these losses by polishing the fiber ends to mate with each other, but this increases the system cost. Another approach involves using a mirrored ellipsoid of revolution (often segmented in two opposing halves) and positioning of the two fiber or bundle ends at the two respective foci. This approach suffers from reflection losses (one reflection only) in the reflector as well as aberration losses as explained earlier. Two opposing CPCs have been used in the past for this application and have the advantage that there are no aberration losses, yet when using classical reflective CPC one still has reflection losses of between 6% to 30%, since for each connector two CPC are required and thus there are two reflections.

Figure 8:
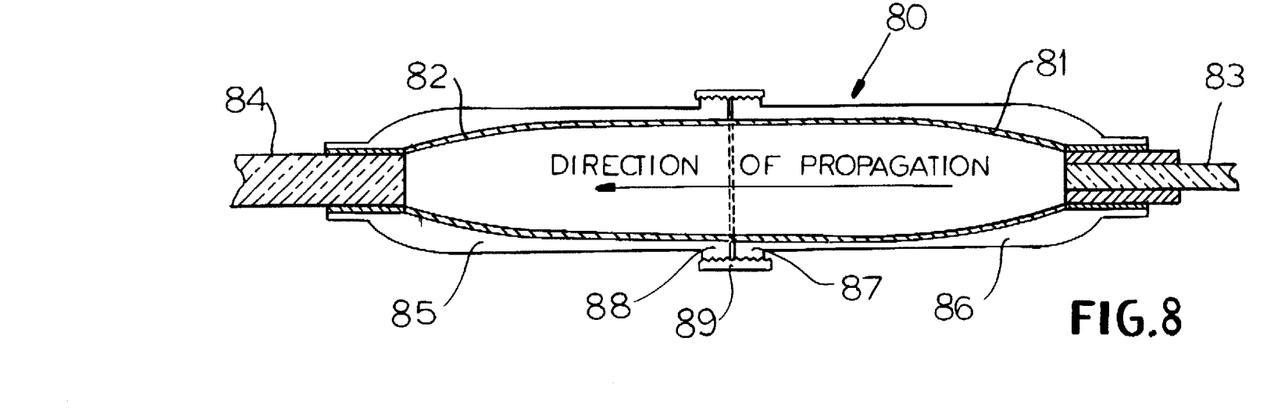
FIG. 8 is a cross section through dual CPC based optical connector.

FIG. 8 shows a prismatic reflector based CPC connector 80 of the instant invention that can be manufactured at a very low cost and would have reflection losses smaller than 2% (as compared with up to 30% losses incurred in a similar cost normal reflector based CPC).

The connector 80 is composed of two opposing $\theta_i/\theta_o$ type CPCs 81 and 82 as described earlier with respect to FIG. 7 and FIG. 3. The direction of propagation of the light is from the right to the left, and thus the CPC 81 is in essence a spotlight and the CPC 82 is a concentrator. The two CPCs have the same output angle, $\theta_o$, but can have different input angles, $\theta_i$, if the two bundles differ in diameter. The diameter of the incoming bundle 83 can be smaller than the entry diameter of the CPC 81 but the diameter of the outgoing fiber 84, must be as close as possible to the diameter of the concentrator 82 to minimize concentration losses. The two protective envelopes, 85 and 86, are terminated at their facing output apertures with threads, 87 and 88 on which an external threaded fastener 89 is used to fasten the two elements together. It should be clear that other means of fastening the two elements, 81 and 82, are possible as well. For instance, one can terminate the output aperture external envelope of one element with a female thread and the second element with a mating male thread. One can also use bayonet-like connections or any other means of fastening the two CPCs in alignment.

EXAMPLE 3

An optical-fiber-based light distribution system has a number of advantages in different situations. Such a system allows the conversion of energy to light in relatively high power devices that drastically increase the energy conversion efficiency from electricity to light, and reduce heat rejection problems at the various points of use, by concentrating all light related heat sources at one place. For instance, a 75 Watt incandescent light source produces about 1100 lumen or less than 15 lumen/watt, but a 1000 Watt high intensity discharge (HID) light source produces 110,000 lumen or 110 lumen/watt. The gain of energy conversion efficiency, is however, rapidly lost in a typical state of the art fiber optics based distributed lighting system, since such a system incurs collection, transmission and connection losses which often exceed the aforementioned increase in efficiency. When attempting the construction of a fiber optics based distributed lighting system, one finds the need to concentrate a light source into a smaller area in order to make the transmission line cross section between the light source and the luminaires narrower. Up to three additional reflectors need to be used, two for a connector and an additional classical parabolic reflector to concentrate the light. When using a traditional CPC for the concentrator, an elliptical reflector for the connector and a classical parabolic reflector for beam angle reduction, reflection losses can reach 45% due to three reflections and additional losses occur due to optical aberrations (the fact that the fiber is not dimensionless and cannot be positioned at the exact focus of the connector's elliptical reflector). The use of prismatic CPCs of the instant invention for these devices greatly reduces these losses.

Figure 9:
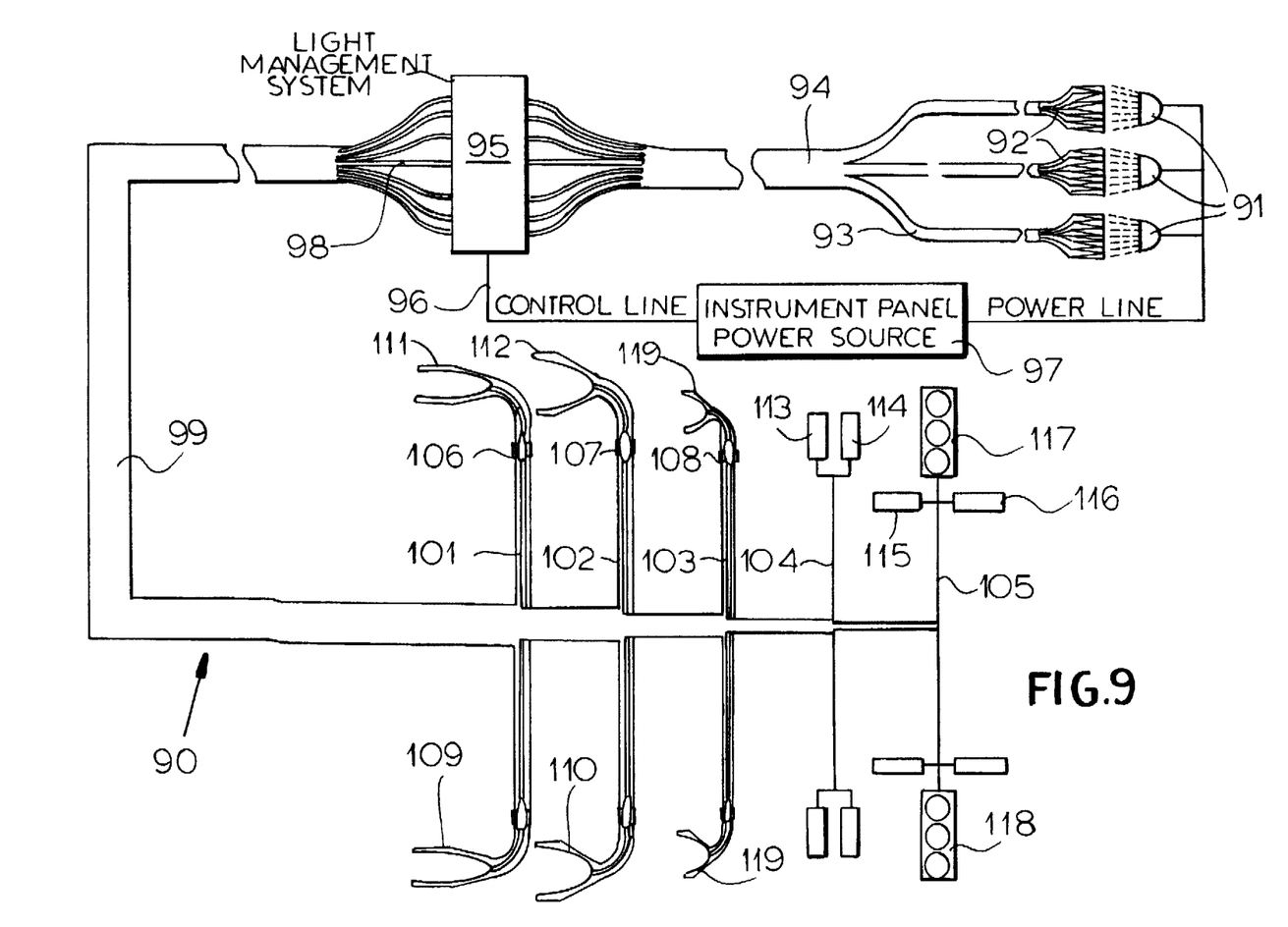
FIG. 9 is a schematic diagram of a remotely illuminated optical-fiber-based distributed lighting system.

FIG. 9 is an example a remotely powered light distribution system using the prismatic reflector light concentrators, spotlights and connectors of the instant invention, in which these losses are drastically reduced. It should be understood that while the following description relates to light distribution in passenger cars, the same principles apply to may other optical fibers based light distribution systems as well.

In a typical passenger car there are between 30 to 40 separate light bulbs, not counting the light sources used for lighting gauges and instruments on the dashboard. To power this system the car is equipped with a relatively expensive wire harness requiring labor intensive production and installation. A passenger car requires two classes of luminaires providing light at various flux levels. The first class can be characterized as "projection luminaires" and the second class encompasses various types of "diffuse luminaires". Projection luminaires include headlights, long lights and other optional lighting systems, their main function is to provide night visibility of (mostly external) objects that reflect back to the driver light projected on them. These luminaires usually require very high light fluxes since only a small percentage of the light projected is reflected back to the driver. For these projection luminaires the system described herein uses spotlights as described in connection with FIG. 7. Diffuse luminaires can be divided into two subclasses, a class of luminaires that is intended for observers outside the car and a number of internal utility lights and instrument lights. These lights are seen directly by the observers and the passengers, and as such require much smaller fluxes. Furthermore, to allow visibility from various angles, these luminaires should possess lambertian light distribution. Remotely powered lambertial luminaires have been described in a copending application 08/587,579 (filed on 17 Jan. 1996) as well as in U.S. Pat. Nos. 5,222,795 and 5,301,090.

The system 90 of FIG. 9 is powered from two to three main light sources 91. Light from these sources is collected and concentrated with prismatic concentrators 92 as shown in FIG. 1, into a set of optical fibers 93 having a large numerical aperture or a large angle of acceptance. This allows for reduction of the overall cross section of the optical fiber harness. A light harness having a cross section similar to the emission area of the light sources would not be practical to handle and install, and would be of high cost. The concentrator can be built to concentrate the light into individual fibers, but it usually is more practical to concentrate the light into sub-bundles of optical fibers. The light transmission fibers are collected into an optical harness 94 that interfaces with a light management system 95. The length of this first optical harness depends on the relative position of the light management system and the light generation system. It is most practical to have the light management system in the back of the instrument panel, or as an integral part thereof since most of the lighting control functions originate in the vicinity of the instrument panel (namely proximal to the driver), and such positioning will obviate the need for an electrical harness to transmit signals from the car operator to the light management system. Few of the control functions that are generated away from the driver, namely lighting of the trunk, the engine compartment and optional reading lights at the passenger seats, can be controlled locally at the point of light use (either automatically as in the former two applications, or manually as in the latter one). If the light generating system can be nested near the control panel, essentially as an integral function of the light management system, then, the first optical harness can be completely eliminated.

The light management system has a number of functions. The main function is to select specific paths or fibers to accept light and transmit it to specific luminaires. The light management system is also capable of managing (within some rational limits) the temporal distribution of light into a diversity of luminaires. Namely, if some luminaires need not be on, their light can be used to provide a higher level of illumination in active luminaires. Some examples of the potential uses of this feature will be given below. These control functions can be achieved in a number of ways well known in the prior art, including diverting mirror or concentrators to shift light between apertures, active absorbers (Pockel cells, liquid crystal or polymer dispersed liquid crystal based light modulators) for dimming, and blocking screens, to prevent light entry into certain luminaires. The actuation of these devices is electrical, and controlled by the control line 96 between the instrument panel and power source 97 and the light management system 95. The light management system includes on its input a plurality of spotlight type devices and on its output a plurality of concentrator type devices.

The output of the light management system is divided into sub-harnesses 98 each dedicated to a specific luminaire. One can bunch the output of different luminaires that require the same actuation together and split the optical harness only near the luminaire (for instance, headlight luminaires in pairs of high and low lights, backing luminaires, parking luminaires, some instrument panel and some interior luminaires). The light flux in each luminaire is thus controlled in the light management system. As stated above, control functions include: on and off, selective and total dimming, light flux allocation and redirection between various luminaires.

Figure 10:
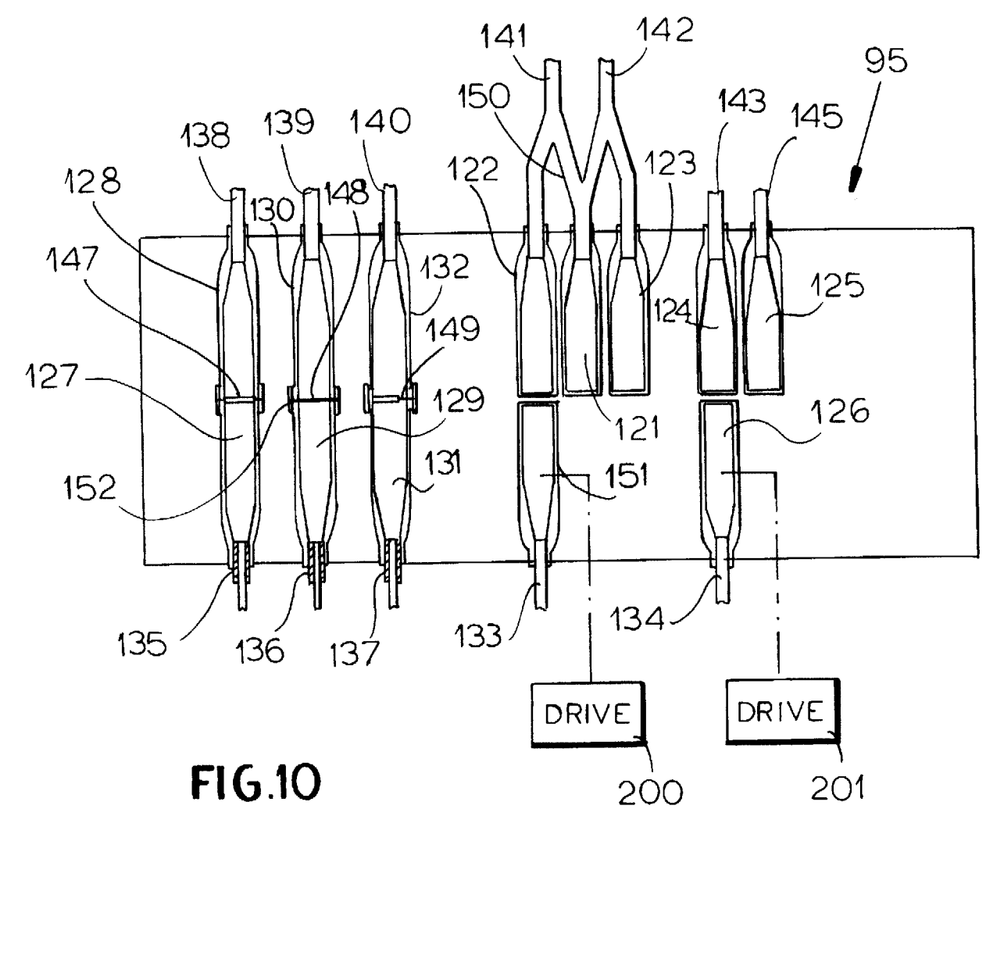
FIG. 10 is a schematic description of a light management system that can be used in an optical-fiber-based light-distribution system.

A more detailed description of a specific example of a light management system 95 is shown in FIG. 10. Light from the light sources is directed to the light management system through a plurality of optical fiber bundles 133, 134, 135, 136 and 137. Each of the fiber bundles is terminated with its own CPC 121, 134, 135, 136 and 137.

Among other things, the light management system has the function of distributing light from a given source to either of two outputs or to both outputs. This function is exemplified in the group of CPCs 151 (input) and 121, 122 and 123 (outputs). The input CPC 151, which is powered by the fiber bundle 133, is provided with means (drive 200) to position it selectively opposite to any of its opposing output CPCs 121, 122 and 123. In FIG. 10, it is shown in the position opposite the output CPC 122. The means for moving the input CPC 151 can be mechanical or electrical but are not specifically shown. The outputs of the three output CPC 122, 121, and 123 are connected to a light manifold 150 consisting of three input ports and two output ports. This manifold can be made from individual fibers or molded a single element from transparent dielectric material. When the input CPC is indexed to be in opposition to the output CPC 122, all light from the input is delivered to the fiber bundle 141 which can then power a luminaire or a group of luminaires. When the input CPC 151 is indexed to be opposite the output CPC 121, light is distributed between the output 141 and 142. The apportionment of the light is a function of the design of the manifold 151. One can design this manifold to apportion the light equally between the outputs 141 and 142 or unequally. For instance, if the manifold 151 is made of individual fibers, the number of fibers coupled to the CPC 121 can be divided in any ratio desired between the outputs 141 and 142. Finally, when the input CPC 133 is opposite the output CPC 123, all the light is directed to the output 142. This arrangement allows for directing the light to either of the outputs 141 or 142, or distributing of the light between the outputs 141 and 142.

A simpler light management function in which light from an input fiber bundle 134 can be diverted to either the output bundle 143 or 145 is provided by means (drive 201) to move the input CPC 126 to a position opposite either CPC 124 or 125. As above, it should be clear that the means to provide the translational movement of the input CPC 134 could be either electrical or purely mechanical. It should also be clear that the translational movement to bring a specific input CPC opposite to an output CPC in both of the above examples could be attached to either the input or the output CPCs in a specific light management system.

Another light management function that can be incorporated in the light management system 95 is the dimming of specific luminaires or groups of luminaires. This function is demonstrated in the three coupled CPCs 127 and 128, 129 and 130 and 131 and 132. The respective inputs of these CPC couples are 135, 136 and 137 and these consists of optical fibers powered by one or more light sources 91 (in FIG. 10). Typically all luminaires that need to be powered and dimmed simultaneously would be powered from a single CPC couple, and thus the respective output bundles 138, 139 and 140 would be powering such groups of luminaires or specific luminaires. These CPC couples are essentially optical fiber or fiber bundle connectors as described in FIG. 8. Dimming can be obtained in a number of ways, three of which are shown in FIG. 10. In the CPC couple 127, 128, an active optical element 147 is inserted in the path of the light between the two opposing CPCs. This active element can be, as mentioned before a Pockel cell, a layer of liquid crystal sandwiched between transparent electrodes and cross polarizers, or a film of polymer dispersed liquid crystal (PDLC). These active element operates by the application of an electrical field between the opposing surfaces of the element which result in modulation of the light traversing the elements. Pockel cells require relatively large voltage and liquid crystals block half of the light in the inactive state but both can provide complete extinction of the light traversing same. PDLC films, while providing extinction coefficients that are smaller than the former two system have the advantage of low cost and almost full transmission in the nonblocking state.

In CPC couple 129 and 130 enables dimming of the light by the rotational insertion of a flag 148 in the path of the light, the flag rotating about a side axis 152 within the fastening device between the two CPCs. In the CPC couple 131 and 132, a similar flag 149 is translationally inserted in and out of the path of the light. Both of these mechanical dimming systems can provide a full range of dimming by controlling the portion of the light path which is blocked.

Referring back to FIG. 9, from the light management system, all the sub-harnesses can be consolidated into a single second optical harness 99 from which sub-optical bundles, 101 to 105, leading directly to the various luminaires are branched out. The connection, (for instance 106, 107 and 108) between a given sub-optical bundle and its luminaire is preferably achieved via an optical connector of the instant invention as described in FIG. 8.

In a typical passenger car there can be four projection luminaires for headlights (109 to 112). Other luminaires used as directional and parking lights 113 and 114, internal and utilities lights 115 and 116 and instrument panel lighting 118, are diffuse luminaires with a luminous surface that is essentially lambertian. Such optical fibers powered lambertian luminaires can be designed according to the teaching of U.S. Pat. Nos. 5,222,795, 5,301,090 or the U.S. patent application Ser. No. 08/587,579 mentioned above. The diffuse luminaires described in these patents and the pending application have unique properties. They can be made to be very thin (if desired even less than 2 mm), they can be molded into unusual shapes without adversely affecting the light output, they can have very small or very large areas of light emission, and the light output per unit area can be kept to within at least 20% of the median light level. Furthermore, the luminaire is practically cold, thus avoiding problems of overheating that occur in panel instruments where the hot incandescent lights touch part of the plastic enclosure of the system. One can obtain substantial cost reduction since the luminaire's "lens" is an integral part of the luminaire itself, and thus one can replace (in assembly and part production) a connector, a bulb mount, a bulb socket, a bulb and a lens with a single optical element. While the preferred embodiment of the invention utilizes either fiber based or wave guide based luminaires, other optical fiber powered lambertial luminaire can be used as well for that purpose.

The light management system enables simple but valuable variations on current car illumination techniques and enables for dual use of the light budget available. For instance, current backing lights provide very little visibility when backing up, however, when using the system described herein, one can provide wide angle spot luminaires, 119 for the backing lights at no additional light budget cost. When the driver sets the car in reverse, a preset portion of the headlights flux is redirected to the backing lights system, for instance with the help of the light apportionment system (CPCs 121, 122, 123 and 151) as described in FIG. 10. During the night, when the drivers' eyes are very sensitive, and when the car's headlights are powered, all the directional and brake lights need not be intensively powered. During the day, however, when the headlights are off, and when it is difficult to observe the weak light of the directional lights and brake lights, the light management system can redirect part of the inactive headlight flux to directional and braking lights and thus provide much better day visibility of these signals.

While FIG. 9 shows three light generating devices, the entire lighting system can be supplied from a single high flux light source. One of the advantages in having two or three light generating sources is the ability to provide system redundancy. One can organize the car's lighting system so that light from more than one of the light sources powers each luminaire, thus failure of one of the light sources will not cause total failure of part of the lighting system, but just reduction in the luminaire intensity. A designer may also choose to have fewer or a greater number of light sources to allow for the fact that the light budget requirements during day and night differ markedly.

The nature of the proposed luminaires and their very flat geometry will decrease a car's dead space in general. Furthermore, such luminaires can be easily fastened on the outer surface of the trunk door, and thus allow lowering to the back bumper of the closure of the trunk door. In many current passenger cars, the trunk door's closure is above the backing lighting system, this makes loading and unloading the trunk a major task for an individual with limited strength.

Yet another example of dual use of light resources involves illumination within the trunk of a car as well as under the hood illumination. Current art provides very little night visibility and cost limitations preclude the installation of higher intensity lighting system. Since a car with it's hood or trunk open rarely requires the use of high beam lights, the light resources usually directed to the high beams can be diverted to these spaces when the trunk or the hood are opened.

One can also consider hybrid systems in which some of the luminaire light sources are near their respective luminaire, particularly in the instrument panel where a high intensity green LED can be used to power the instrument panel luminaires. Or, to avoid the use of very high power central luminaires, a hybrid system would have traditional light sources for headlights and centrally powered diffused luminaires for the rest of the car's lights.

While the light distribution system has been described for a passenger car, it should be understood that the same principles would apply to lighting passenger and other airplanes. Centrally located high intensity light sources would be enclosed in few selected explosion proof enclosures from which light would be transmitted with optical fibers to various point of uses. External projection lights and reading lights within the passenger cabin would use the spotlight luminaires described with reference to FIG. 7, while general cabin illumination, sign illumination and safety floor lights would be implemented with diffuse luminaires. Such a system will reduce assembly costs and reduce electrical short hazards within the passenger cabin.

Similarly, one can consider the same principles for large public spaces, where during the day, light from the sun is collected with a linear collector and fed to a distributed lighting system, and during the night, the same system is powered by few high power HID light sources.

The implementation of the light distribution system of the instant invention with current state of the art concentrators, connectors and reflecting luminaires would require at least 6 reflecting surfaces (one light concentrator, two light management system reflection, two connector reflections and one luminaire reflection), thus incurring between 60% to 90% optical losses, not counting substantial collection and transmission losses. When using the prismatic reflector CPC of the instant invention, these losses can be reduced to less than 6% reflection losses. The concentration of light into circular fibers involves about 30% optical losses due to light escaping between fibers. Dielectric losses in the transmission fiber can be kept to less than 10%, depending on the length of the light transmission harness. It is possible therefore to keep the system's optical losses well within 50%, which is amply compensated for by the much higher conversion efficiency of large centralized luminaires in the instant invention, relative to distributed energy conversion bulbs in traditional systems.

I claim:

1. An optical device comprising:

a hollow body formed at one side with an input aperture of a first cross sectional area and connectable to a light source, and formed at an opposite side with an output aperture of a second cross sectional area different from said first area for delivery of light at said second cross sectional area; and wall means connecting said input aperture with said output aperture and diverging from a smaller of said cross sectional areas to a larger of said cross sectional areas, said wall means consisting of contiguous elongated prisms facing the hollow of said body and of a transparent dielectric material extending between said apertures and defining internal reflection paths along a cross section of the material between said apertures and enabling single-reflection transmission of light from said inlet aperture to said outlet aperture within said wall means whereby the light flux is greater at said smaller of said cross sectional areas than at said larger of said cross sectional areas each of said prisms has a base flank defining a surface of said hollow body bounding an interior space thereof, and a pair of flanks including angles of 45° with said base flank and 90° with one another.

2. The optical device defined in claim 1 wherein said input aperture is said larger of said cross sectional areas and has a small acceptance angle, said output aperture has a large emission angle, and said device is an optical concentrator.

3. The optical device defined in claim 1 wherein said input aperture is said smaller of said cross sectional areas and has a large acceptance angle and said output aperture has a small emission angle.

4. The optical device defined in claim 1 wherein said body has a closed periphery around an axis connecting said input aperture with said output aperture.

5. The optical device defined in claim 1 wherein said wall means is formed with a pair of walls extending symmetrically on opposite sides of a median plane connecting said input aperture with said output aperture and said apertures are rectangular.

6. The optical device defined in claim 1 wherein said prisms periodically spaced larger prisms mechanically stiffening said body.

7. The optical device defined in claim 1 wherein said base flanks of adjoining prisms angularly adjoin one another.

8. The optical device defined in claim 1 wherein said base flanks of adjoining prisms merge smoothly into one another.

9. The optical device defined in claim 1 wherein the hollow of said body is a surface of revolution of generally parabolical shape.

10. The optical device defined in claim 9 wherein said surface of revolution is partly conical.

11. The optical device defined in claim 9 wherein said surface of revolution is partly hyperbolical.

12. The optical device defined in claim 1, further comprising at least one optical fiber coupled to said body at one of said apertures.

13. The optical device defined in claim 1 wherein said transparent dielectric material has a refractive index in excess of $\sqrt{2}$.

14. The optical device defined in claim 1 wherein said transparent dielectric material has a refractive index in excess of 1.5.

15. An optical connector comprising two devices as defined in claim 1, the hollow body of one of said devices forms a light concentrator receiving light at its larger cross sectional area aperture, the other of said devices comprising another hollow body connectable to the first-mentioned hollow body with the larger cross sectional area apertures of said bodies being in alignment and said other hollow body receiving light at the smaller cross sectional area aperture thereof.

16. The optical connector defined in claim 15, further comprising a light modulator received between said larger cross sectional area apertures of said hollow bodies.

17. The optical connector defined in claim 15, further comprising means for moving one of said hollow bodies relative to the other hollow body to selectively bring said larger cross sectional area apertures of said hollow bodies into and out of alignment.

18. The optical device defined in claim 1, further comprising a protective housing enclosing said wall means out of contact therewith.

19. The optical device defined in claim 1, further comprising a window spanning said larger cross sectional area aperture.

* * * * *